Aug. 30, 1955  A. C. BODY  2,716,689
HIGH-FREQUENCY INDUCTION SEAM WELDING
Filed May 25, 1951  3 Sheets-Sheet 1

INVENTOR.
ALFRED C. BODY
BY
ATTORNEY

Aug. 30, 1955  A. C. BODY  2,716,689
HIGH-FREQUENCY INDUCTION SEAM WELDING
Filed May 25, 1951  3 Sheets-Sheet 2

INVENTOR.
ALFRED C BODY
BY
Alfred C Body
ATTORNEY

INVENTOR.
ALFRED C. BODY
BY
Alfred C. Body
ATTORNEY

United States Patent Office 2,716,689
Patented Aug. 30, 1955

2,716,689

HIGH-FREQUENCY INDUCTION SEAM WELDING

Alfred C. Body, Cleveland, Ohio, assignor to The Ohio Crankshaft Company, Cleveland, Ohio, a corporation of Ohio Application May 25, 1951, Serial No. 228,294

13 Claims. (Cl. 219—6)

This invention pertains to the art of continuous welding of the edges of a longitudinally-split tube and, more particularly, to apparatus for inducing high-frequency electric currents to flow in the tube and between the edges for the purposes of heating the edges to the welding temperature.

This application is, in some respects an improvement on the method and apparatus for continuous welding described in British patent specification No. 377,655 filed in England January 21, 1931 and the copending patent application of Alfred C. Body, Serial No. 198,453 filed November 30, 1950, now Patent No. 2,632,079.

In the British patent specification, a method of seam welding the edges of a generally C-shaped metallic tube is described wherein the tube, with its edges in slightly-spaced relationship, moves at a uniform speed through a multiturn helical coil energized from a high-frequency power source. The coil acts as the primary of a transformer with the tube as the secondary thereof and high-frequency voltages are generated between the edges. The edges are brought into abutting engagement just after they leave the coil, thus completing an electrical circuit or loop in which the induced voltages cause current to flow in opposite directions along the spaced edges and then between the abutting edges. This loop may be described generally as extending circumferentially under the coil, longitudinally beyond the exit end of the coil in one direction along one edge to the point of engagement of the edges and thence in the other direction along the other edge back to under the coil. The current flows between the edges in a highly concentrated manner to very rapidly heat the edges to the welding temperature. This process has been termed "induction resistance welding."

The above referred to application of Alfred C. Body, in some respects, constitutes an improvement on the disclosure of the British specification and describes a method and apparatus for continuous welding wherein a high-frequency inductor induces concentrated high-frequency currents to flow in the same direction longitudinally in both edges immediately under the inductor to partially heat the edges and then, subsequently, induces circumferential currents to flow in the tube and between the edges after the edges emerge from the exit end of the inductor to further and finally heat the edges to the welding temperature.

In each case, the edges are brought together beyond the exit end of the inductor and it was felt the induced currents flow beyond the end of the coil and between the edges as they are brought into engagement.

As a result of the present invention, I have found that not all of the currents flow beyond the exit end of the coil; that is, in the portion circumferentially spaced from the edges which it is desired to heat. This is a low-impedance current path at normal induction-heating frequencies. These currents produce little or no heating but they do materially reduce the amount of current available for effecting the heating of the edges as they were brought into abutting engagement. The proportion of currents flowing in this undesired current path can be reduced by having the exit end of the coil quite close to the point of abutment of the edges. However, the presence of the welding rolls required to force the edges into abutting engagement limits this solution. Because of these rolls, it is impossible to position the exit end of the inductor sufficiently close to the point where the edges were brought into engagement so as to shorten the desired current path the desired amount. Even so, the undesired current path still exists with a low enough impedance to siphon off some of the desired current flow between the edges.

Another difficulty is that the welded areas themselves are electrically in parallel with the area where the edges come into abutment which tends to siphon off or bypass some of the desired current flow between the edges as they are brought together.

The present invention contemplates new and improved means for causing all or a very much larger percentage of the induced currents to flow between the edges as they are brought into abutting engagement rather than to flow in other undesired parts of the tube such as the back portion or through the already welded area.

In accordance with the present invention, there is provided, for use with apparatus for progressively-welding the normally spaced edges of a continuously-moving, longitudinally-split tube including a high-frequency energizing coil for inducing a current flow between the edges when they are brought into engagement, and means for bringing the edges together after they emerge from the coil, means magnetically coupled with the tube between the coil and the means for bringing the edges together for increasing the proportion and concentration of induced currents flowing between the edges.

Such means may include, either singly or in combination, means having a high electrical conductivity in an axial direction of the tube closely coupled with the edges from the exit end of the inducing coil to the point of initial engagement of the edges, magnetically-permeable means having a high electrical resistivity in a circumferential direction closely coupled with the sides of the tube laterally spaced from the edges between the exit end of the coil and the point of engagement of the edges and magnetically-permeable means having, preferably, a high electrical resistivity in all directions in close-coupled relationship with the already welded edges.

The effect of the low-resistivity means is to lower by magnetic coupling the impedance of the edges, from the coil to the point of initial engagement of the edges, to the flow of high-frequency currents therealong. The effect of the magnetically-permeable means is to increase the impedance of the side walls of the tube beyond the exit end of the coil laterally spaced from the edges to the flow of high-frequency currents therein, as well as to increase the impedance of the already welded edges to the flow of high-frequency currents therein.

The low-impedance means may be in the form of a narrow elongated copper bar in close-spaced parallel relationship with the edges either on the inside or the outside. This bar, preferably, does not extend in the direction of movement of the tube appreciably beyond the point of engagement of the edges. The magnetically-permeable high-impedance means may comprise a sleeve of magnetically-permeable material either laminated or powdered or otherwise which surrounds the tube from the exit end of the coil to a point preferably beyond the point of engagement of the edges. The magnetically-permeable means may also include a member of magnetically-permeable material positioned interiorly of the tube.

The principal object of the invention is the provision, in continuous, tube seam-welding equipment of the type referred to, of new and improved means for concentrating the principal portion of the induced current at the point of initial engagement of the edges to be welded, which means is simple in construction, electrically efficient and inexpensive to manufacture.

Another object of the invention is the provision of new and improved means for lowering the impedance of the edges between the exit end of the inductor coil and the point where the edges are brought together comprising a member of high electrical conductivity in magnetically close-coupled relationship with the edges.

Another object of the invention is the provision of new and improved means for increasing the reactance in the portions of the tube circumferentially spaced from the edges which comprises a member surrounding portions of the tube, and/or positioned interiorly thereof of high magnetic permeability having a low electrical conductivity in a circumferential direction of the tube.

Another object of the invention is the provision of new and improved means for increasing the reactance of the edges to the flow of high-frequency electric current at points beyond where they have been brought into engagement and welded which comprises a member of high magnetic permeability having a relatively low conductivity in close-coupled relationship with the already welded edges.

Another object of the invention is the provision of new and improved means for increasing the current flow between the edges at the point of engagement which comprises a member or members adapted to be disposed exteriorly of and/or interiorly of the tube in at least the space between the exit end of the inducing coil and the point where the edges are brought into abutting engagement which includes a portion of high electrical conductivity in close-spaced relationship to the edges and other portions of high magnetic permeability and low electrical conductivity at least in a direction measured circumferentially of the tube in close-spaced coupled relationship with the sides of the tube circumferentially spaced from the edges.

Another object of the invention is the provision of a new and improved roller adapted to force the edges of C-shaped tube into abutting engagement so that high-frequency induced currents may flow therebetween, the roller being formed of magnetically-permeable material so constructed and arranged as to have a low electrical conductivity in a circumferential direction relative to the tube.

Other and more specific objects will appear upon a reading and understanding of this specification.

The invention will be specifically set forth and defined in the claims appended at the end hereof. The invention may be embodied in a number of different-appearing parts and arrangement of parts and a preferred embodiment of one of such arrangements will be described in detail in this specification and illustrated in the accompanying drawing which is a part hereof, and wherein:

Figure 1:
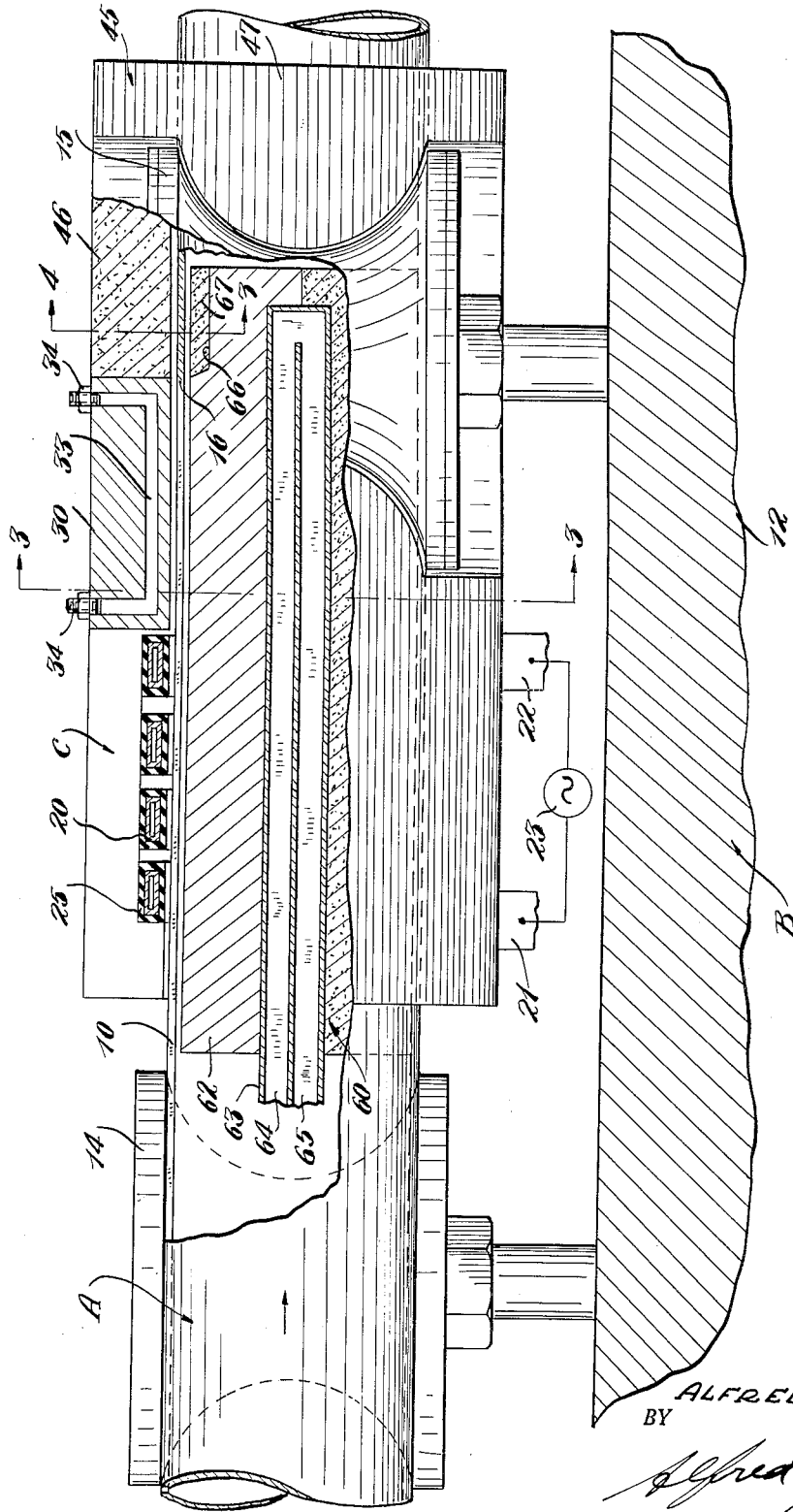
Figure 1 is a side elevational view partly in section of a continuous seam-welding machine and high-frequency inductor arrangement showing a preferred embodiment of the invention.
Figure 2:
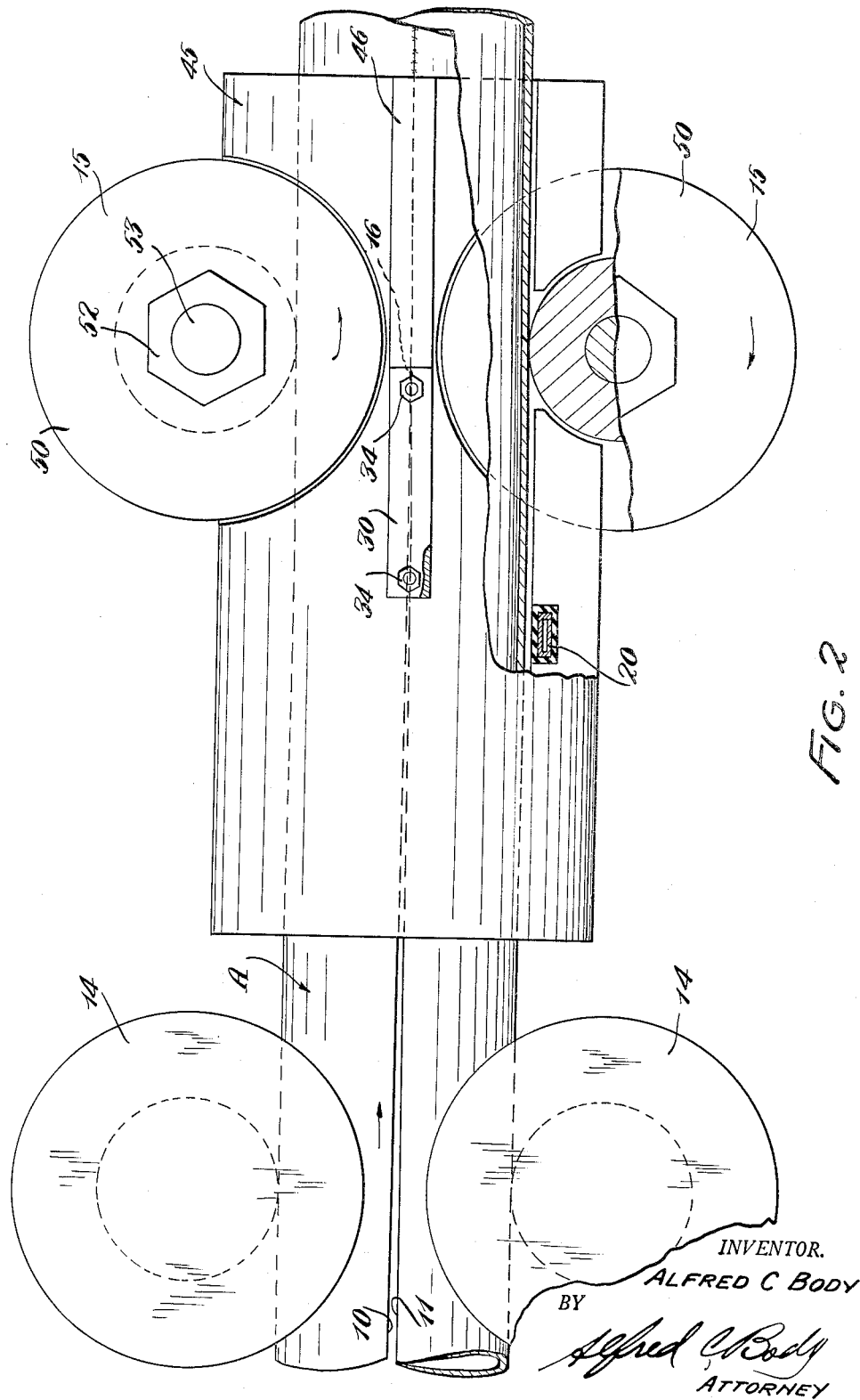
Figure 2 is a top elevational view of Figure 1 with portions broken away for the purposes of clarity.

Referring now to the drawings wherein the showings are for the purposes of illustration only and not for the purposes of limiting the invention, the figures show a tube A having normally spaced edges 10, 11 moving from left to right through a continuous seam-welding machine B including, generally, a base 12 and opposed pairs of forming rolls 14 and opposed pairs of welding rolls 15 rotatably mounted on the base 12. A high-frequency inductor arrangement C is positioned between the forming and welding rolls 14, 15 for the purposes of inducing welding currents in the tube A which will heat the edges 10, 11 to the welding temperature as they pass through the welding rolls 15.

The tube A is shown as being cylindrical, although it may be of any desired cross-sectional shape or configuration and may be formed of any known electrically-conductive material, such as copper, aluminum, steel, stainless steel or the like. The tube A is normally formed from a continuous length of flat narrow strip of the desired material by passing the strip through the forming rolls 14, one pair of which only are shown in the drawing. The tube A leaves the last set of forming rolls 14 with its edges 10, 11 in slightly-spaced relationship and these edges are then brought into abutting engagement by the welding rolls 15 at a point designated by the reference character 16. This point will, depending upon the adjustment of the welding rolls 15 and the type of material employed, be located on a line through the axes of rotation of the welding rolls 15 or generally to the left thereof; that is, towards the approach end of the rolls.

In the type of welding to which this invention refers, it is desired to have the high-frequency currents induced to flow in the tube A flow along the edges and then between the edges at the point 16. If these currents are sufficiently concentrated at this point, a very rapid and localized heating can be made to occur which will raise the edges to the welding temperature without appreciably heating other portions of the tube A remote from the edges at the point 16. Also, the currents flowing along the edges produce heating to some degree. These currents are induced to flow in the tube A by the inductor arrangement B.

The inductor arrangement C in the embodiment shown comprises generally a multiturn helical coil 20 formed of rectangular hollow tubing connected through radially-extending end terminals 21, 22 to a high-frequency power source 23. The power source may be of any known type but, for the purposes of welding, most materials and diameters of tube may have a frequency of approximately 10,000 cycles per second. These frequencies may be generated by an inductor-alternator type of generator which has proven to be extremely dependable, rugged and practicable. If necessary, frequencies on the order of 450,000 cycles per second may be employed, which frequencies will normally be generated by the use of vacuum-tube oscillators.

The coil 20 is of rather relatively conventional construction and, as shown, each tube thereof has a layer of insulation 25 thereabouts. The inner diameter of the coil 20 is preferably just slightly greater than the outer diameter of the tube A which it is desired to weld. Obviously, coils having a somewhat greater internal diameter may be employed with a slight decrease in coupling efficiency to the tube A. The coil is shown as being formed of four turns. Obviously, it may have more or less turns and the spacing of the turns may be greater or less than that shown. Round tubing or a solid conductor may also be employed. Tubing is preferred in order that a cooling medium may be circulated continuously therethrough. The plumbing connections for this purpose are not shown in the drawings.

The exit end of the coil 20 is placed as close to the approach end of the rolls 15 as is possible, although it will be appreciated that some spacing is necessary in order that the presence of the rolls 15 will not distort the magnetic field about the coil 20. In any event, it is generally impossible to bring the exit end of the coil 20 to coincide with the point 16 so that the currents induced to flow by the coil 20 must flow out of the field of the coil 20 in order to flow between the edges at the point 16. These currents divide in accordance with the reactances of the various circuits presented by the tube A beyond the exit end of the coil 20. The present invention contemplates means and method for providing a low-impedance or low-reactance current path from the coil to the point 16 and a high-impedance or high-reactance current path elsewhere in the tube beyond the exit end of the coil 20.

In the embodiment shown, low-impedance means in the form of a narrow copper bar 30 extend in close-spaced parallel relationship to the edges 10, 11 from the exit end of the coil 20 to the point 16 or just slightly therebeyond. This bar 30 is generally in the shape of a trapezoid having the narrower of its parellel sides facing the edges 10, 11. The angular sides are angled so that the plane of each passes through the axis of the tube A. An internal passage 33 from one end of the bar 30 to the other is provided so that cooling water may be circulated therethrough. Connectors 34 are shown for the purpose of making suitable plumbing connections to the bar 30.

The inductor arrangement C also includes magnetically-permeable means which substantially completely fill the remainder of the space; that is, the space exclusive of that occupied by the bar 30, between the exit end of the inductor 20 and the rolls 15 and which also surrounds the coil 20 itself. In the embodiment shown, such magnetically-permeable means comprises a cylindrical stack of magnetically-permeable laminations, such as transformer iron or the like, each of which laminations extend generally longitudinally of the tube A and preferably with their plane through the axis of the tube A. The sides of these laminations have a suitable thin layer of insulating material such as oxides of the iron or actual insulated coatings so as to give the laminations a high electrical resistance in a direction measured circumferentially of the tube. Obviously, powdered iron or other magnetically-permeable materials could be employed.

In the embodiment shown, each lamination is pie or wedge shaped in cross section with the angle between the sides so arranged that the plane of the sides will pass through the axis of the tube A. With such a construction, a completely solid cylindrical stack of magnetically-permeable material is obtained.

As shown, the left end of the stack of laminations extends beyond the left or entrance end of the coil 20 and the inner surface of the stack of laminations is recessed to receive the coil 20. The right or exit end of the stack of laminations extends beyond the end of the coil 20 to the rolls 15 and is so shaped and formed so as to mate or match with the irregular contour of the mating external surface of the tube A and the formed surfaces on the rolls 15.

Figure 3:
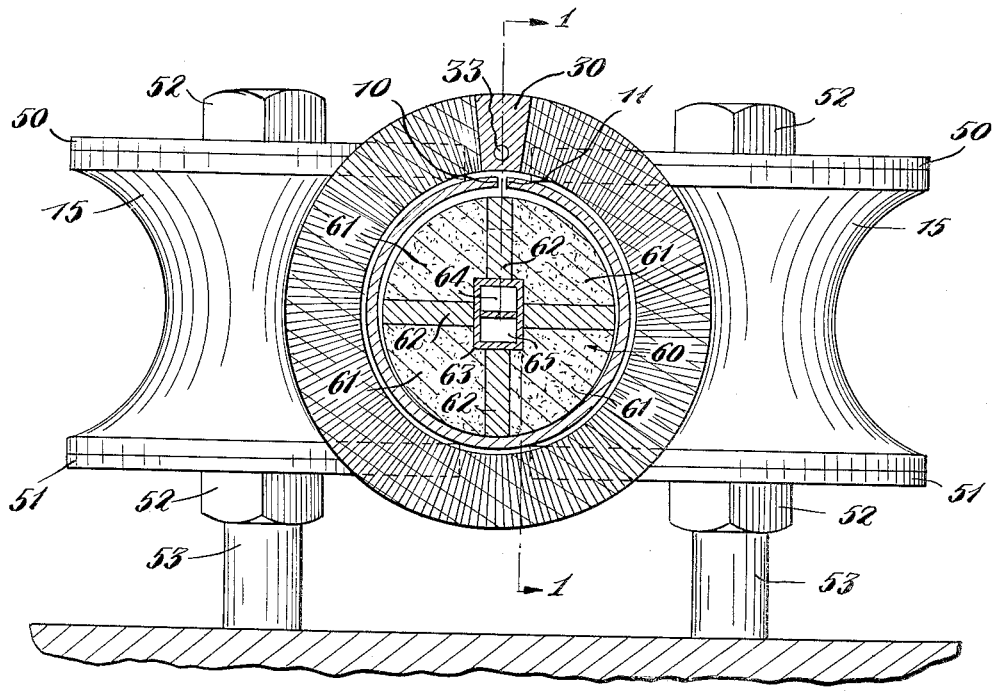
Figure 3 is a sectional view of Figure 1 taken approximately on the line 3—3 thereof.

As shown in Figure 3, the laminations in the region between the exit end of the coil 20 and the rolls 15 completely surround the tube A except for the bar 30 which is symmetrically arranged about the edges 10, 11. The sides of the laminations abut against the sides of the bar 30 to form at this point also a solid cylindrical stack of metallic material. If desired, the bar 30 can be insulated from the laminations.

The effect of the laminations between the exit end of the coil 20 and the rolls 15 is to impart to the side walls of the tube circumferentially spaced from the edges 10, 11 a high reactance to the flow of the high-frequency current therein, thus decreasing or eliminating these undesirable currents. The laminations extending beyond the opposite or entrance end of the coil 20 have a like effect on the portions of the tube between the entrance end of the coil and the roll 14.

The inductor arrangement C also includes magnetically-permeable means positioned to the right of the rolls 15. In the embodiment shown, such means comprise a cylindrical member 45 of magnetically-permeable material. In the embodiment shown, the member includes generally a narrow elongated member 46 preferably formed of powdered magnetic material extending in close-spaced parallel relationship with the edges 10, 11 from the right-hand end of the bar 30 toward the right for a distance substantially beyond the rolls 15. The member 46 is formed generally in the shape of a trapezoid with the narrower of the parallel sides facing the welded edges 10, 11. The angular sides are angled so that the plane thereof passes through the axis of the tube A. The remainder of the member 45 may be formed of powdered, magnetically-permeable material but is preferably formed of a cylindrical stack of magnetically-permeable laminations 47 having their plane through the axis of the tube A. These laminations are preferably also pie or wedge shaped in cross-sectional shape. The purpose of forming the member 46 of powdered, magnetically-permeable material is to provide this member with a high electrical resistance in all directions. Any stray current which might be flowing in the tube A beyond the point 16 will either be flowing longitudinally of the tube A or transversely across the welded edges and, if the member 46 were not formed of powdered magnetically-permeable material, the flow of current in at least one of these directions would be encouraged if ordinary laminated materials were employed. The remainder of the member 45 is made of laminated structure because of the lesser cost of the laminated material.

Figures 4, 5:
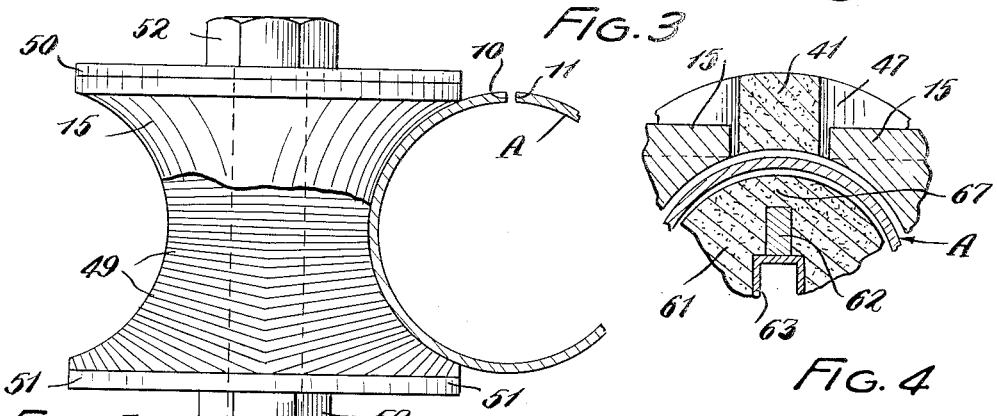
Figure 4 is a fragmentary sectional view of Figure 1 taken approximately on the line 4—4 thereof.
Figure 5 is a view partly in section of a welding roller embodying the present invention.

The invention also contemplates so forming the rolls 15 so as to have high magnetic permeability and a high electrical resistance in a direction measured circumferentially of the tube A so as to further discourage the flow of the back currents in the tube A. Thus, in Figure 5, the rolls 15 are shown as comprised of a stack of generally conical-shaped laminations 49 held in assembled relationship by an upper cover member 50 and a lower cover member 51, which cover members are held together by nuts 52 on each end of the shaft 53 which supports the roll 15 on the base 12. The laminations, as shown, are so arranged that the plane of the sides of each lamination passes through the axis of the tube A. Such a construction calls for the median lamination to be generally flat, with each lamination out therefrom having an increasing angle relative to the axis of rotation of the rolls 15 or the shaft 53. These laminations have a thin layer of insulation therebetween to provide a high electrical resistivity in a circumferential direction.

The inductor arrangement C also includes a cylindrical member disposed interiorly of the tube A and generally coextensive with the ends of the inductor arrangement disposed exteriorly of the tube A. In the embodiment shown, this member is comprised of an assembly of axially-elongated segments 61 generally pie-shaped in cross section of magnetically-permeable material and interleaved axially-extending radial laminations 62 of copper, all arranged about a rectangular hollow tube of copper 63. The segments 61 may either be laminated or of compressed powdered magnetic material. The copper laminations 62 are preferably brazed to the outer surface of the hollow tube 63 and form, with the hollow tube 63, means for cooling the member 60. For this purpose, the hollow tube 63 has a pair of passages 64, 65 extending throughout the length thereof and communicated at the right-hand end. The opposite or left-hand ends of these passages communicate with a source of a cooling medium through pipes (not shown). These pipes extend to the left to a point where the edges 10, 11 are spaced a sufficient distance apart in the forming operation from the strip to a tube so that the cooling-water connections may be provided.

The member 60 may be physically supported interiorly of the tube so as to be actually coaxial with the tube A or, and preferably, the lower side of the member 60 may rest on and drag on the lower inner side of the tube A.

One of the copper laminations 62 is shown as having its outer surface in close-spaced parallel relationship to the edges 10, 11 particularly from a point to the right of the coil 20 towards the rolls 15. Thus, this lamination operates in conjunction with the bar 30 to lower the reactance of the edges 10, 11 between the exit end of the coil 20 and the point 16. The upper edge of this lamination beyond the point 16 is shown, as at 66, as being cut away and the space provided thereby filled with magnetically-permeable material 67, which material cooperates with the member 46 to provide a high reactance to the flow of current beyond the point 16. The other copper lamination 62 may extend to the surface of the member 60 or terminate short thereof as desired. They will have no over-all effect on the current flow in the tube A.

In operation, the tube A moves from left to right through the forming rolls 14, the inductor coil 20 and the welding rolls 15. In this operation, the edges 10, 11 are in close-spaced relationship until they reach the point 16 where the welding rolls bring them into abutting electrical engagement.

Figure 6:
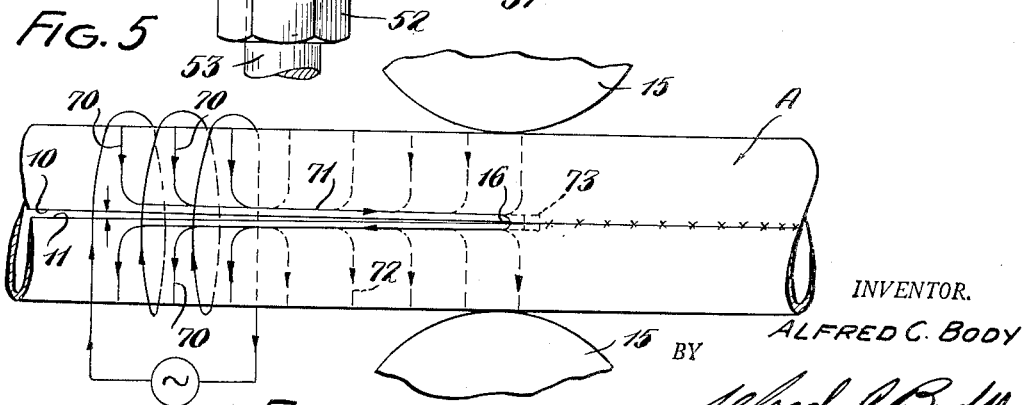
Figure 6 is a diagrammatic view of the current paths with which the present invention deals.

The coil 20 is energized from a high-frequency power source so that high-frequency currents flow therein. While these currents are continually reversing their directional flow at any one instant, these currents at any one instant may have the direction shown by the arrowheads in Figure 6. The currents in the coil 20 generate a high-frequency magnetic flux field which links with the tube A and generates a voltage $e$ between the edges 10, 11. In this case, the tube A acts as the secondary of a transformer. The voltage $e$ causes a circumferential current flow in the side walls of the tube A immediately under the inductor as shown by the lines 70 having an instantaneous direction of flow as indicated by the arrowheads. In the ideal welding setup, these currents would flow longitudinally along the edges 10, 11 to the point 16 where they would then flow between the edges in a very highly-concentrated manner, rapidly heating these edges to the butt-welding temperature. This ideal current flow is shown as a solid line 71 in Figure 6. Examination of the electrical characteristics of the tube A will show that there are at least two other possible current paths for the current other than through the point 16. One of these current paths is shown by the dashed lines 72 which is in a circumferential direction in the tube beyond the right-hand or exit end of the coil 20. This current-flow path is in parallel with the current-flow path through the point 16. Obviously, the current in the path 72 cannot produce useful heating at the point 16.

The other path of possible current flow is indicated by the dotted line 73 through and between the edges 10, 11 to the right of the point 16; that is, after the edges have become welded. This current path is in direct parallel relationship with the desired path of current through the point 16. Obviously, any current flowing in this path cannot flow through the point 16 and, therefore, will act to cut down or siphon off part of the available welding current.

The currents in the various paths 71, 72 and 73 are high-frequency currents and generate high-frequency magnetic flux fields about the tube A. The proportion or value of these various currents will depend upon the relative reactance of the various current paths. The present invention attempts to alter the normal reactances of these current paths so that a greater proportion of the current will flow through the point 16 and not in the paths 72, 73. The copper bar 30 is in close-spaced parallel relationship with the edges 10, 11 between the exit end of the coil 20 and the point 16. The flux lines created by the current flowing in the path 71 link with the copper bar 30 and create a current flow therein. However, as the resistivity of the bar 30 is very low, the effect is for the bar 30 to lower the reactance of the edges 10, 11 to the flow of current. This lowering of the reactance of the edges 10, 11 will tend to increase the proportion of current flowing in the path 71.

At the same time, the flux of the currents flowing in the path 72 link with the magnetically-permeable material about the side walls of the tube, which material has a high electrical resistance in a circumferential direction relative to the tube A. The effect of this magnetically-permeable material is to increase the reactance of the path 72, thus decreasing the flow of current here or further increasing the proportion of currents flowing through the point 16. In a like manner, the magnetically-permeable material in the bar 46 having a high electrical resistivity in all directions tends to increase the reactance of the edges 10, 11 to the right of the point 16, thus tending to cut down the amount of currents in the path 73 and further increasing the proportion of the total currents induced flowing through the point 16. The positioning of the magnetically-permeable material and the copper-cooling fins on the member positioned interiorly of the tube A further contributes to decreasing the reactance of the current path 71 while increasing the reactance of the current paths 72 and 73.

It will thus be seen that there has been described apparatus capable of accomplishing the objects of the invention and which enables improved concentrations of current with a minimum of power supplied to the tube.

The copper bar 30 has been shown as separate from and insulated from the coil 20. It will be appreciated that, if desired, the leads 21, 22 could be brought out from the coil 20 so as to extend in close-spaced parallel relationship to the right of the coil 20 and in close-spaced parallel relationship with the edges 10, 11 from the right or exit end of the coil 20 to at least the point 16.

Short circumferentially-extending laminations can be positioned about the sides and/or outer surface of the bar 30 to increase its coupling to the edges 10, 11, if necessary.

The invention has been described with reference to a preferred embodiment; such as, for example, the type of inducing coil 20. The invention may also be employed with inductor coils of the type shown and described in the above-referred to copending application of Alfred C. Body. It will also be appreciated that any one of the various elements for directing the current flow as above described may be employed either singly or in combination with each other.

Alterations and modifications will occur to others upon a reading and understanding of this specification. It is my intention to include all such modifications and alterations insofar as they come within the scope of or are equivalent to the appended claims.

Having thus described my invention, I claim:

1. In a continuous seam-welding machine adapted to advance a longitudinally-split tube along a predetermined path with edges of the tube in spaced relationship and then move said edges into abutting relationship at a predetermined point in said path of movement, said machine including high-frequency energized inducing means disposed in advance of said point for inducing high-frequency currents to flow in the tube and between the edges at said point, the improvement which comprises means of low electrical resistivity and having a circumferential width in relation to the tube of less than 180° disposed in close-spaced parallel relationship with said edges between said inducing means and said point.

2. In a continuous seam-welding machine adapted to advance a longitudinally-split tube along a predetermined path with edges of the tube in spaced relationship and then move said edges into abutting relationship at a predetermined point in said path of movement, said machine including high-frequency energized inducing means disposed in advance of said point for inducing high-frequency currents to flow in the tube and between the edges at said point, the improvement which comprises magnetically-permeable means having a relatively high electrical resistance at least in a circumferential direction disposed about the portions of said tube circumferentially spaced from said edges between at least the exit end of said inducing means and the plane of said point.

3. In a continuous seam-welding machine adapted to advance a longitudinally-split tube along a predetermined point in said path of movement, said machine including high-frequency energized inducing means disposed in advance of said point for inducing high-frequency currents to flow in the tube and between the edges at said point, the improvement which comprises means of high magnetic permeability having a high electrical resistivity in close-spaced parallel relationship with said edges beyond said point.

4. In a continuous seam-welding machine adapted to advance a longitudinally-split tube along a predetermined path with edges of the tube in spaced relationship and then move said edges into abutting relationship at a predetermined point in said path of movement, said machine including high-frequency energized inducing means disposed in advance of said point for inducing high-frequency currents to flow in the tube and between the edges at said point, the improvement which comprises magnetically-permeable means disposed inside of said tube coextensive with said inducing means and extending longitudinally therebeyond at least to the point of engagement of said edges, said means being circumferentially spaced from said edges.

5. In a continuous seam-welding machine adapted to advance a longitudinally-split tube along a predetermined path with edges of the tube in spaced relationship and then move said edges into abutting relationship at a predetermined point in said path of movement, said machine including high-frequency energized inducing means disposed in advance of said point for inducing high-frequency currents to flow in the tube between the edges at said point, the improvement which comprises a member disposed internally of said tube and comprising a narrow portion of high electrical conductivity having its outer edge in close-spaced parallel relationship with said edges at least to said point of engagement of said edges and other portions of high magnetic permeability, the outer surface of which is in close-spaced relationship to the inner walls of said tube circumferentially spaced from said edges.

6. In a seam-welding machine adapted to advance a longitudinally-split tube along a predetermined path with the edges in spaced relationship and then move the edges into abutting relationship at a predetermined point in said path and having high-frequency inducing means disposed in advance of said point adapted to induce currents to flow in said tube and between said edges at said point, the improvement which comprises a member about said tube between said inducing means and at least to said point, said member including a narrow elongated portion of high electrical conductivity in close-spaced parallel relationship with said edges from said inducing means to said point, a portion of high electrical resistivity and having a high magnetic permeability in close-spaced parallel relationship with said edges beyond said point and a portion of high electrical resistivity at least in a circumferential direction in close-spaced relationship with the walls of said tube circumferentially spaced from said edges.

7. A welding roller for a continuous seam-welding machine comprising a stack of magnetically-permeable laminations and electrical insulating means between said laminations.

8. The combination of claim 7 wherein the surfaces of each lamination are so angled that the plane of the surfaces extends through the axis of the tube being welded.

9. High-frequency induction-heating apparatus comprising a multiturn high-frequency induction-heating coil having an entrance end and an exit end through which a longitudinally-split tube is adapted to be moved with its edges in spaced relationship and then to have the edges moved into abutting relationship beyond the exit end at a predetermined point in combination with a member of magnetically-permeable material about the length of said coil and extending beyond the exit end of said coil a substantial distance.

10. In apparatus of the type described comprising a pair of oppositely-disposed welding rolls having surfaces contoured to receive a continuously-moving longitudinally-split tube having normally spaced edges to be welded, said rolls being disposed so as to bring said edges into abutting engagement at a predetermined point generally between said rolls, a high-frequency induction coil disposed in advance of said rolls and adapted to induce high-frequency currents to flow in said tube and between the point of engagement of said edges, a narrow axially-extending high-conductivity member disposed between the exit end of said coil and the point of engagement of said edges, a member of magnetically-permeable means disposed between the exit end of said coil and said welding rolls, the end of said member adjacent said welding rolls being contoured to mate with the surfaces of said rolls and another member of magnetic material disposed adjacent the discharge end of said welding rolls and having the end adjacent said welding rolls contoured to mate with the surface of said roll.

11. In apparatus of the type described, a pair of welding rolls adapted to have a longitudinally-split tube with normally-spaced edges advanced therethrough and to move said edges together at a point between said rolls, high-frequency inducing means disposed in advance of said rolls and adapted to induce currents to flow between said edges at the point of engagement thereof, a member shaped generally to conform to the interior shape of said tube and comprising an axially-extending member of copper material, the outer surface of which is adapted to be disposed in close-spaced parallel relationship with said edges at least from said coil to a point adjacent said point of engagement of said edges, said member also including axially longitudinally-extending portions of high magnetic permeability on both sides of said low-resistance member.

12. In a continuous seam-welding machine adapted to advance a longitudinally split tube along a predetermined path with the edges of the tube in spaced relationship and then move said edges into abutting relationship at a predetermined point in said path of movement, said machine including high-frequency energized means disposed in advance of said point for causing high-frequency currents to flow in the tube and between the edges at said point, the improvement which comprises magnetically-permeable means in coupled relationship with said tube between at least the exit end of said inducing means and the plane of said point.

13. In a continuous seam-welding machine adapted to advance a longitudinally split tube along a predetermined path with the edges of the tube in spaced relationship and then move said edges into abutting relationship at a predetermined point in said path of movement, said machine including high-frequency energized means disposed in advance of said point for causing high-frequency currents to flow in the tube and between the edges at said point, the improvement which comprises means of high magnetic permeability having surfaces in close proximity to surfaces of said tube disposed at least between the exit end of said inducing means and the plane of said point.

References Cited in the file of this patent

UNITED STATES PATENTS

| | | |
|---|---|---|
| 2,020,276 | Crawford | Nov. 5, 1935 |
| 2,086,305 | Sessions | July 6, 1937 |
| 2,205,424 | Leonard, Jr. | June 25, 1940 |
| 2,209,637 | Sessions | July 30, 1940 |